(12) United States Patent
Walti-Herter

(10) Patent No.: US 8,570,499 B2
(45) Date of Patent: Oct. 29, 2013

(54) METHOD FOR ELECTRONICALLY DETERMINING THE SHOOTING POSITION ON A SHOOTING TARGET

(75) Inventor: Hansruedi Walti-Herter, Wollerau (CH)

(73) Assignee: SIUS AG, Effretikon (CH)

( * ) Notice: Subject to any disclaimer, the term of this patent is extended or adjusted under 35 U.S.C. 154(b) by 0 days.

(21) Appl. No.: 13/392,396

(22) PCT Filed: Aug. 24, 2010

(86) PCT No.: PCT/CH2010/000207
§ 371 (c)(1),
(2), (4) Date: Feb. 24, 2012

(87) PCT Pub. No.: WO2011/022853
PCT Pub. Date: Mar. 3, 2011

(65) Prior Publication Data
US 2012/0194802 A1    Aug. 2, 2012

(30) Foreign Application Priority Data
Aug. 25, 2009   (CH) ................. PCT/CH2009/000281

(51) Int. Cl.
*G01N 21/00*        (2006.01)
*F41J 5/00*         (2006.01)
(52) U.S. Cl.
USPC .............................. 356/72; 273/371; 273/374
(58) Field of Classification Search
USPC .................. 356/3–22, 445–448, 614–624
See application file for complete search history.

(56) References Cited

U.S. PATENT DOCUMENTS 3,487,226 A    12/1969  Yetter et al.
3,624,401 A *  11/1971  Stoller ........................ 250/373

(Continued)

FOREIGN PATENT DOCUMENTS

CH    589 835 A5    11/1977
CH    609 767 A5     3/1979

(Continued)

OTHER PUBLICATIONS

"SIUS A Worldwide First-Laser electronic scoring target for air weapons and small bore rifle providing. Years Ahead in Research and Development.", Laserscore SIUS-ASCOR www.sius.com, , pp. 1-2.

(Continued)

*Primary Examiner* — Tarifur Chowdhury
*Assistant Examiner* — Sunghee Y Gray
(74) *Attorney, Agent, or Firm* — Greenblum & Bernstein, P.L.C.

(57) ABSTRACT

Electronic shooting target having light sources and photoelectric light receivers forming an optical screen via crossing groups of optical paths. A projectile shot through the screen at least temporarily interrupts optical paths. An object is placed in a region of the optical screen and acoustic transducers are spaced from each other for detecting an acoustic wave generated from the object. An electronic evaluator determines a position of the projectile in the optical screen from photoelectric light receiver signals and/or a position of a projectile in the object based on delay times detected by the acoustic transducers of the acoustic wave generated by the projectile shot through the object. The arrangement, in the shooting direction, is structured so that a circular area definable within the optical screen is surrounded at least partially by an area of the object in which the acoustic wave is generated.

31 Claims, 3 Drawing Sheets

(56) References Cited

U.S. PATENT DOCUMENTS

| | | | |
|---|---|---|---|
| 5,218,196 A | 6/1993 | Dogul et al. | |
| 5,245,177 A * | 9/1993 | Schiller | 250/221 |
| 5,405,014 A | 4/1995 | Krieg et al. | |
| 5,559,664 A | 9/1996 | Dogul et al. | |
| 5,577,733 A | 11/1996 | Downing | |
| 5,637,866 A | 6/1997 | Riener et al. | |
| 2007/0040062 A1 * | 2/2007 | Lau et al. | 244/3.16 |

FOREIGN PATENT DOCUMENTS

| | | |
|---|---|---|
| DE | 42 00 971 A1 | 7/1993 |
| DE | 44 15 944 A1 | 11/1995 |
| EP | 0 463 566 A1 | 1/1992 |
| EP | 41 13 677 A1 | 10/1992 |
| EP | 41 15 995 A1 | 11/1992 |
| EP | 91 16 709 U1 | 12/1993 |
| EP | 91 16 984 U1 | 12/1994 |
| EP | 0 819 881 A2 | 1/1998 |
| EP | 0 994 324 A1 | 4/2000 |
| EP | 1 892 495 A2 | 2/2008 |
| EP | 1 978 326 A1 | 10/2008 |

OTHER PUBLICATIONS

"OpticScore", DISAG www.disag.de, , pp. 1-11.
"Shootmaster 11", Meyton Elektronik www.meyton.de.
International Search Report (ISR) conducted in counterpart Int'l Appln. No. PCT/CH2010/000207 (Nov. 29, 2010).
International Search Report (ISR) conducted in parent Int'l Appln. No. PCT/CH2009/000281 (May 6, 2010).

* cited by examiner

METHOD FOR ELECTRONICALLY DETERMINING THE SHOOTING POSITION ON A SHOOTING TARGET

CROSS-REFERENCE TO RELATED APPLICATIONS

The present application is a U.S. National Stage of International Patent Application No. PCT/CH2010/000207 filed Aug. 24, 2012, and claims priority under 35 U.S.C. §§119(a) and 365(a) of International Application No. PCT/CH2009/000281 filed Aug. 25, 2008.

BACKGROUND OF THE INVENTION

1. Field of the Invention

The present invention is related to a method for electronically determining the shooting position on a shooting target, an arrangement for electronically determining the shooting position on a shooting target according to the method as well as a shooting target, particularly a shooting disc, with the arrangement for carrying out the.

2. Discussion of Background Information

Shooting targets with electronic shooting position determination are widespread as "electronic shooting targets" for training purposes as well as for shooting contests. The company Sius AG, Effretikon, Switzerland is the worldwide market leader for such installations, having been active in this field for decades.

The presently known systems can be divided in acoustic and optical or photo-electric systems, respectively.

In case of the acoustic systems, the acoustic wave generated when the projectile passes through the object forming the target surface is measured by multiple acoustic transducers and the shooting position is then determined on the basis of the delay times of the measurement data provided by the transducers. Thereby, the transducers are arranged in an acoustically screened chamber which is limited on one side by the objects forming the target surface. Such shooting targets are for example described in CH 589 835 and CH 609 767.

In case of the optical or photo-electric systems, respectively, the projectile flies through an optical screen which is formed by a plurality of optical paths the exact position of which is known and which, seen in shooting direction, cross each other. Thereby, the projectile temporarily interrupts some of the optical paths, this being detected by photo-electric detectors. By evaluating the signals of the photo-electric detectors, the optical paths which are temporarily interrupted by the projectile during the flight of the projectile through the optical screen are determined and on this basis the shooting position is determined.

The optical systems have the advantage that no wear material is required for the operation, with the result that practically no material costs are generated at least during the training. They are, however, comparatively expensive to buy.

The acoustic systems are much more economical to buy than the optical systems, however, they require in any case a screen made of canvas-like or plate-like material forming the target surface, which is perforated during the passage and which has to be renewed, this being coupled with corresponding running costs.

SUMMARY OF THE EMBODIMENTS

Therefore, embodiments of the invention provide a method for electronically determining the shooting position on a shooting target, an arrangement for electronically determining the shooting position on a shooting target as well as a shooting target with electronic detection of the shooting position, which do not have the above-mentioned disadvantages of the prior art or which at least partly avoid them.

In particular, the noted disadvantages are solved by the method, the arrangement and the shooting target according to the independent claims.

According to this, a first aspect of the invention is related to a method for electronically determining the shooting position on a shooting target, wherein the shooting position is determined exclusively in an opto-electronic manner in a first impact area of the shooting target and is determined preferably exclusively in an acousto-electronic manner in a second impact area of the shooting target.

Preferably, a central impact area of the shooting target is chosen as first impact area and an impact area surrounding the first impact area partially or entirely is chosen as second impact area.

By this method it is possible to determine the shooting position with relatively economical electronic systems and with only low running costs for consumable material by determining the shooting position with an optical measurement system only in the relatively small central target area which typically has a high hit probability and which requires a high precision of the shooting position determination, while the shooting position in the relatively large edge area surrounding this central area is determined with an economical acoustic system.

In a preferred embodiment of the method, the shooting position in a third impact area of the shooting target is determined optionally in an opto-electronic or acousto-electronic manner or in an opto-electronic and acousto-electronic manner. The third impact area is preferably formed between the first and the second impact area of the shooting target, preferably as overlapping area of the first and the second impact areas. This results in the advantage that the possibly imprecise acoustic determination of the shooting position in the edge area of the second impact area can be complemented or replaced by the optical determination of the shooting position.

A second aspect of the invention is related to an arrangement for electronically determining the shooting position on a shooting target by the method according to the first aspect of the invention. This arrangement comprises photo-electric light receivers as well as light sources for transmitting light which can be detected by the light receivers. Preferably, photo diodes or photo transistors are used as light receivers and light-emitting diodes or laser diodes are preferably used as light sources, wherein it is preferred that they operate in the infrared range, preferably in the range of a wave length of 950 nm.

The light receivers and the light sources are arranged relative to each other in such a way that optical paths are formed between the light receivers and the light sources, via which the light receivers can receive light from one of the light sources. Hence, each light receiver has a light path to exactly one light source of the arrangement.

The optical paths form, seen in the intended shooting direction, at least two, preferably exactly three groups of optical paths which cross each other such that they define an optical screen in the area of their crossings, so that a projectile temporarily interrupts at least partially at least one optical path of each of the at least two inter-crossing groups of optical paths when it passes through it. Accordingly, the distances between the optical paths of each group must not be larger in the area of the optical screen than the diameter of the projectile to be detected, preferably not larger than about two thirds of the diameter of the projectile. This diameter is of at least 3 mm, typically between 4 mm and 9 mm, so that the distance between the optical paths in the area of the optical screen used for determining the shooting position should not exceed 3 mm, preferably 2 mm. The groups of optical paths crossing each other may thereby run in a common plane such that their optical paths meet, or they may be arranged, seen in the shooting direction, one after the other with a small offset, such that the optical paths do not meet.

Furthermore, the arrangement comprises multiple acoustic transducers, each one for detecting an acoustic wave which is generated by a projectile when it passes through a canvas-like or plate-like object which in the intended use of the arrangement is running at a short distance parallel to the optical screen and is providing a target surface. The acoustic transducers are arranged at a distance from each other such that different pass-through positions through the canvas-like or plate-like object result in different running times of the acoustic wave to the individual transducers. A small distance is understood in this context as a distance of maximum some centimeters.

Additionally, the arrangement comprises electronic evaluating entity or evaluator by which the pass-through position of a projectile through the optical screen can be determined from the signals provided by the photo-electric light receivers when the projectile passes through the optical screen. The evaluating entity or evaluator is furthermore able to determine the pass-through positions of a projectile through a canvas-like or plate-like object running in the intended use of the arrangement with a small distance parallel to the optical screen and providing the target surface on the basis of the delay times of the acoustic wave detected by the acoustic transducers, which is generated when the projectile passes through the canvas-like or plate-like object. Thereby it is preferred that the evaluating entity or evaluator additionally comprise a display for displaying the respective determined pass-through position, e.g. a monitor.

The light sources and the light receivers as well as the acoustic transducers are arranged in such a way and the electronic evaluating entity or evaluator is formed in such a way that, seen in the intended shooting direction, a circular area of maximum diameter, which can be defined within the optical screen, thus within the area inside which the pass-through position of a projectile through the optical screen can be determined by the signals provided by the photo-electric light receivers, is surrounded partially or entirely by the area or is located partially or entirely in the area inside which the pass-through position of a projectile through a canvas-like or plate-like object running in the intended use of the arrangement with a small distance parallel to the optical screen can be determined on the basis of the delay times of the acoustic wave detected by the acoustic transducers.

Preferably, the arrangement is formed in such a way that the circular area of maximum diameter defined within the optical screen is in diameter of at most half the size of a circular area of maximum diameter with the same circle center, which can be defined in the area in which the pass-through position of a projectile through a canvas-like or plate-like object running in the intended use of the arrangement with a small distance parallel to the optical screen can be determined on the basis of the delay times of the acoustic wave detected by the acoustic transducers.

By the invention it becomes possible to provide shooting targets with electronic shooting position determination, in which the shooting position is determined by an optical measurement system only in the relatively small central area which typically has a high hit probability and which requires a high precision of the shooting position determination, while the shooting position in the relatively large edge area surrounding this central area is determined with an economical acoustic system. In this way the investment costs for the shooting target as well as also the running costs for consumable material can be kept very low.

Advantageously, the acoustic transducers are arranged in a plane parallel to the optical screen, wherein the distance of this plane to the optical screen is preferably less than 20 mm. By this, a particularly compact arrangement according to the invention is the result.

In a further preferred embodiment of the arrangement, it comprises a plurality of individual photo-electric light receivers. The light receivers and the light sources are arranged with respect to each other in such a way that an optical path is formed between each single light receiver and one of the light sources, via which the light receiver can receive light from the light source. In this way the number and the spatial arrangement of the light receivers can be individually adjusted to the respective requirements.

Preferably, a light source is attributed to each one of the groups of optical paths, by which all of the optical paths of the respective group can be provided with light by emitting a continuous light, particularly by emitting a continuous light screen like for example a light band or a light array. Thus, single light beams are not generated for each light receiver but a single continuous light beam is generated for all light receivers of a group, preferably with a shape corresponding substantially to an envelope surface around the optical paths of this group.

Thereby it is further preferred that the arrangement is formed in such a way that the optical paths of the intercrossing groups run in a diverging way towards the light receivers starting from the light source attributed to this group. By this, a high energy density in the area of the light-active surfaces of the light sources is the result, this resulting in operation in a warming up of these surfaces, thus counteracting a dew formation on these surfaces and thereby an uncontrolled dispersion of the light emitted by the respective light source.

In yet a further preferred embodiment of the arrangement, all optical paths of the optical screen used for the shooting position determination run in a plane or have a distance of at most +/−3 mm with respect to a plane formed in the middle between the optical paths. The entire optical screen formed by the optical paths has, seen in shooting direction, a thickness of at most 6 mm. By this, a parallax error in the optical screen due to an oblique shooting can be avoided or at least reduced to a minimum.

In yet a further preferred embodiment of the arrangement, all optical paths of the optical screen have the same length. By this, substantially comparable operation conditions result in operation for all light receivers.

In yet a further preferred embodiment of the arrangement, at least a part of the optical paths of the optical screen is deflected, preferably via mirror surfaces or prisms. By this, a spreading of the groups of optical paths outside the area inside which they form the optical screen is possible, such that it is further possible to arrange the optical paths in the area of the optical screen with a considerably smaller mutual distance than it is possible in case of non-deflected optical paths, in case of which the minimum distance of the optical paths is preset by the size of the light receivers. This again enables a finer resolution and thereby a more precise determination of the shooting position.

In yet a further preferred embodiment of the arrangement, the optical paths of each of the inter-crossing groups have each a smaller mutual distance and/or a smaller divergence in the middle area of the respective group than in the edge areas of the group. By this, a finer resolution and thereby a more precise determination of the shooting position is possible in the center of the optical screen, which in the intended use of the arrangement seen in shooting direction coincides with the center of the target surface of a shooting target equipped with the arrangement, than in the edge areas.

In yet a further preferred embodiment of the arrangement, the light receivers attributed to the light paths of the inter-crossing groups are arranged per group in such a way that their photo-electric-sensitive surfaces are arranged in one or more rows side by side. By this it is possible to form in a simple way certain advantageous configurations.

Thereby, for embodiments in which the optical paths of the inter-crossing groups have a smaller mutual distance and/or a smaller divergence in the middle area, it is preferred that this is reached by arranging the photo-electric-sensitive surfaces in a larger number of rows side by side and mutually shifted in the middle area than in the edge areas of the group. By this it is possible to obtain a finer resolution and thereby a more precise determination of the shooting position in the center of the optical screen than in its edge areas.

Also, for embodiments of the arrangement according to the invention, in case of which the photo-electric-sensitive surfaces are arranged in one or more rows side by side, it is preferred that the photo-electric-sensitive surfaces arranged side by side of the light receivers attributed to one group of optical paths are provided with an optical diffuser and/or a lens arrangement, for optically decreasing or cancelling out the (not photo-electric-sensitive) gaps which are present between the individual photo-electric-sensitive surfaces by light dispersion.

In yet a further preferred embodiment, the arrangement comprises furthermore a fan arrangement for acting upon the photo-electric sensitive surfaces of the light receivers and/or of the light-active surfaces of the light sources with an air stream for avoiding an accumulation of dirt like for example dust or paper scraps.

In yet a further preferred embodiment, the arrangement or its light receivers and the electronic evaluating entity or evaluator, respectively, are formed in such a way that a plurality of different brightness values can be distinguished for each light receiver in order to determine the pass-through position of a projectile through the optical screen. By this it is possible to substantially increase the resolution because different degrees of partial coverings of the individual optical paths, which result from different pass-through positions of the projectile passing through the optical screen with respect to the respective optical path, can be detected and evaluated.

Thereby it is further preferred that the electronic evaluating entity or evaluator is formed in such a way that a continuous self-calibration of the arrangement with respect to the maximum and minimum brightness values occurring for each light receiver is possible in operation based on the signals delivered by the light receivers and the determined pass-through positions. For this, the signals delivered by the light receivers before a shot through the optical screen can for example be recorded as maximum brightness values for the respective light receiver and a signal delivered by a light receiver, the light path of which was determined during a shooting as being completely covered as a result of the determined shooting position during a shooting, can be recorded as minimum brightness value for this light receiver, and subsequently the signal range of the light receiver limited by this can be classified in a certain number of signals attributed to different partial coverings of the light path. By this, a variance of the characteristics and a drift of the light receivers can be eliminated and the long term precision can be substantially increased.

In yet a further preferred embodiment of the arrangement, the electronic evaluating entity or evaluator is additionally formed in such a way that a calibration of the arrangement is possible by approaching defined pass-through positions in the optical screen with a projectile dummy or with an opaque body representing a shooting path respectively. By this, the precision of the arrangement can be increased and a variance of the characteristics of the light receivers can also be eliminated.

In yet a further preferred embodiment, the arrangement is formed in such a way that the signals of the light receivers can be evaluated at least 100,000 times per second, preferably at least 200,000 times. By this it is possible to record many times even short projectiles of i.e. 4 mm during the flight through the optical screen and thereby to determine their speed, shape and/or thickness with high precision. As a result of the multiple measurements it is furthermore possible to eliminate possible interference signals by comparing with other correct signals.

It is consequently preferred to form the evaluating entity or evaluator of the arrangement in such a way that they make possible a determination of the above mentioned variables and/or an elimination of interference signals.

A third aspect of the invention is related to a shooting target, preferably a shooting disc, for carrying out the method according to the first aspect of the invention, with an arrangement according to the second aspect of the invention as well as with a canvas-like or plate-like object running parallel to the optical screen of the arrangement at a small distance, meaning a distance of at most a couple of centimeters, preferably a rubber tissue, plastic foil like i.e. PVC-foil, paper or carton, which forms a substantially plane surface for shooting at with projectiles.

In other words, the third aspect of the invention is thus related to a shooting target with electronic shooting position determination in which the shooting position is determined exclusively in an opto-electronic manner in a first shooting area of the shooting target and exclusively in an acousto-electronic manner in a second shooting area of the shooting target which preferably entirely or partially surrounds the first shooting area.

By this, a shooting target with electronic shooting position determination can be provided, in case of which the shooting position is determined with an optical measurement system only in the relatively small central target area which typically has a high hit probability and which requires a high precision of the shooting position determination, while the shooting position in the relatively large edge area surrounding this central area is determined with an economical acoustic system. In this way, investment costs for the shooting target as well as the running costs for consumable material can be kept very low.

For this it preferred that the canvas-like or plate-like object has an advantageously round target opening in a central area, which can be passed through by a projectile in the intended shooting direction without penetrating the canvas-like or plate-like object, and that the shooting target is formed in such a way that the pass-through position of a projectile flying in the intended shooting direction through this target opening at an arbitrary position, can be determined based on the signals delivered by the photo-electric light receivers when the projectile passes through the optical screen, and that the pass-through position of a projectile penetrating the canvas-like or plate-like object in the intended shooting direction in a surface area surrounding the target opening can be determined from the running time differences of the acoustic wave detected by the acoustic transducers which is generated by the projectile when it passes through the canvas-like or plate-like object.

Thereby it is advantageous that the shooting target is formed in such a way that, seen in the intended shooting direction, a circular area of maximum diameter, which can be defined within the optical screen, thus within the area inside which the pass-through position of a projectile through the optical screen can be determined by the signals provided by the photo-electric light receivers, is congruent with the target opening or extends to a minimum extent beyond the limits of the target opening. By this, the shooting target can be designed in a particularly economical way because the optical shooting position determination only has to be dimensioned for the central area and has an accordingly smaller complexity as compared to purely optical measurement systems. In the last mentioned case that the circular area of maximum diameter, seen in the intended shooting direction, extends to a minimum extent beyond the limits of the target opening, the advantage results that a possibly imprecise acoustic shooting position determination in the edge area of the target opening can be replaced by or complemented with the optical shooting position determination.

In a further preferred embodiment of the shooting target, the acoustic transducers are arranged, seen in the intended shooting direction, behind the canvas-like or plate-like object because by this they can detect particularly well the acoustic wave generated during the shooting through the canvas-like or plate-like object.

The optical screen is arranged, seen in the intended shooting direction, in front of or behind the canvas-like or plate-like object.

In yet a further preferred embodiment of the shooting target, the arrangement according to the invention for the photo-electric determination of the shooting position is arranged in such a way that the optical paths of the optical screen run diagonally in front of, behind and/or in the target plane, wherein the light detectors are arranged above the light sources. By this, a contamination of the light receivers by accumulation of dust and paper scraps of a paper target possibly used as target surface is avoided. Additionally, the light-active surfaces of the light source can be formed in an oblique way because of the diagonal extension of the optical paths, such that an accumulation of dust and of paper scraps on these surfaces is at least made more difficult.

Embodiments of the invention are directed to a method for electronically determining the shooting position on a shooting target having a first impact area and a second impact area at least partially surrounding the first impact area. The method includes determining the shooting position in an opto-electronic manner in the first impact area of the shooting target; and determining the shooting position in an acousto-electronic manner in the second impact area.

According to embodiments, the first impact area can be in a central portion of the shooting target and the second impact area may entirely surround the first impact area.

In accordance with other embodiments, a third impact area may be arranged as an overlapping area of the first and second impact areas, the method can also include determining the shooting position in at least one of an opto-electronic manner and an acousto-electronic manner in the third impact area.

Embodiments of the invention are directed to an arrangement for electronically determining a shooting position on a shooting target according to the above-noted method. The arrangement includes light sources for transmitting light; and photo-electric light receivers, structured and arranged to detect the light transmitted by the light sources, being arranged to form optical paths between the light sources and the light receivers, the optical paths being formed into at least two inter-crossing groups to define an optical screen arranged generally perpendicular to the shooting direction. At least one optical path of each of the inter-crossing groups is at least temporarily interruptable by a projectile passing through the optical screen. At least one of a canvas-like or plate-like object is arranged generally parallel to and at a distance from the optical screen; multiple acoustic transducers are arranged at a distance from each other for detecting an acoustic wave generatable by a projectile when shot through the at least one canvas-like or plate-like object; and an electronic evaluator is structured and arranged to determine at least one of a pass-through position of the projectile in relation to the optical screen from signals received from the photo-electric light receivers and a pass-through position of a projectile in relation to the at least one canvas-like or plate-like object based on delay times detected by the multiple acoustic transducers of an acoustic wave generatable as when the projectile passes through the at least one canvas-like or plate-like object. The arrangement is structured so that a circular area definable within the optical screen is surrounded at least partially by an area of the at least one canvas-like or plate-like object in which the acoustic wave is generatable.

According to embodiments of the invention, the at least two inter-crossing groups of optical paths may be exactly three inter-crossing groups of optical paths.

In accordance with other embodiments, the at least one canvas-like or plate-like object can be a circular object arranged so a center of the circular object is aligned with the circular area in the shooting direction, and the circular area may have a diameter of at most two thirds a diameter of the circular object.

According to still other embodiments of the instant invention, the multiple acoustic transducers may be arranged in the plane parallel to the optical screen, which can be located at a distance smaller than 20 mm to the optical screen.

In accordance with still other embodiment, the light receivers can include a plurality of individual photo-electric light receivers, such that an optical path can be formed between each of the plurality of individual photo-electric light receivers with light received from one of the light sources.

In other embodiments, a light source can be associated with each of the at least two inter-crossing groups of optical paths in order to generate all of the optical paths of the inter-crossing group by emitting a continuous light body. Further, the optical paths can be generated in each of the at least two inter-crossing groups are oriented in a diverging manner starting from the light source attributed to this group. Moreover, the optical paths generated in each of the at least two inter-crossing groups may be oriented to run in a same plane or have a distance of at most +/−3 mm with respect to a plane formed in the middle between the optical paths.

According to further embodiments of the invention, the optical paths generated in each of the at least two inter-crossing groups can have the same length.

Still further, at least a part of the optical paths can be deflected via mirror surfaces or prisms.

In still further embodiments of the invention, the optical paths of each of the at least two inter-crossing groups may have at least one of a smaller mutual distance and a smaller divergence in a middle area of each respective group than in edge areas of the respective groups.

According to further embodiments of the invention, the light receivers forming the optical paths for each of the at least two inter-crossing groups can be arranged per group in such a way that their photo-electric-sensitive surfaces are arranged side by side in one or more rows. The photo-electric-sensitive surfaces can each arranged side by side in a middle area of a respective group in a higher number of rows than in the edge areas of the group. Further, at least one of an optical diffuser and a lens arrangement for optically decreasing or cancelling out gaps can be present between individual photo-electric-sensitive surfaces.

In accordance with other embodiments, a fan arrangement for acting upon at least one of photo-electric sensitive surfaces of the light receivers and light-active surfaces of the light sources with an air stream for avoiding an accumulation of dirt can be included.

According to still further embodiments, the light receivers and the electronic evaluator can be structured and arranged so that a plurality of different brightness values are distinguishable for each light receiver in order to determine a pass-through position of the projectile through the optical screen. Further, the electronic evaluator can be structured and arranged for continuous self-calibration of the arrangement via determination of maximum and minimum brightness values occurring for each light receiver based on signals delivered by the light receivers at determined pass-through positions of the projectiles.

In accordance with other embodiments, the electronic evaluator can be structured and arranged for calibration of the arrangement via approaching defined pass-through positions in the optical screen with a projectile dummy or with an opaque body representing a shooting path respectively.

According to still other embodiments of the invention, signals of the light receivers are evaluatable at least 100,000 times per second. Further, the electronic evaluator may be structured and arranged to determine at least one of a speed, a shape and/or a thickness of the projectile by evaluating the signals delivered by the photo-electric light receivers during the passage of the projectile through the optical screen.

According to further embodiments, the diameter of the circular area may be at most one half the diameter of the circular object.

Still further, the light emitted by the light source may be emitted as a continuous light screen.

According to still other embodiments of the instant invention, the optical paths generated in each of the at least two inter-crossing groups may be oriented to run in parallel planes arranged to be separated from each other by a distance of at most +/−3 mm with respect to a plane formed between the parallel planes.

In accordance with other embodiments, signals of the light receivers are evaluatable at least 200,000 times per second.

Embodiments of the invention are directed to a shooting target, particularly shooting disc, that includes the above-described arrangement. Further, the at least one canvas-like or plate-like object, which is structured and arranged to form a substantially plane surface for shooting at with projectiles, includes one of a rubber tissue, plastic foil, paper or carton.

According to embodiments, the at least one canvas-like or plate-like object can have a round target opening in a central area, through which a projectile traveling in the shooting direction is passable without penetrating the at least one canvas-like or plate-like object. Further, a position of the projectile passing through the round target opening is determinable based on signals delivered by the photo-electric light receivers when the projectile passes through the optical screen. The at least one canvas-like or plate-like object can be arranged to surround the round target area, and a position of the projectile penetrating the at least one canvas-like or plate-like object is determinable from delay times detected by the acoustic transducers of an acoustic wave generated by the projectile penetrating the at least one canvas-like or plate-like object. Additionally or alternatively, a circular area coaxial with the round target area may extend to at least an edge limit of the round target area.

According to embodiments, relative to the shooting direction, the acoustic transducers can be arranged behind the at least one canvas-like or plate-like object and the optical screen may be arranged one of in front of or behind the at least one canvas-like or plate-like object.

In accordance with still yet other embodiments of the present invention, the optical paths of the optical screen can be arranged to run diagonally at least one of in front of, behind and in a target plane and the light detectors are arranged above the light sources.

BRIEF DESCRIPTION OF THE DRAWINGS

Further preferred embodiments of the invention result from the dependent claims as well as from the now following description of the drawings. It is shown in:

DETAILED DESCRIPTION OF THE EMBODIMENTS

Figure 1:
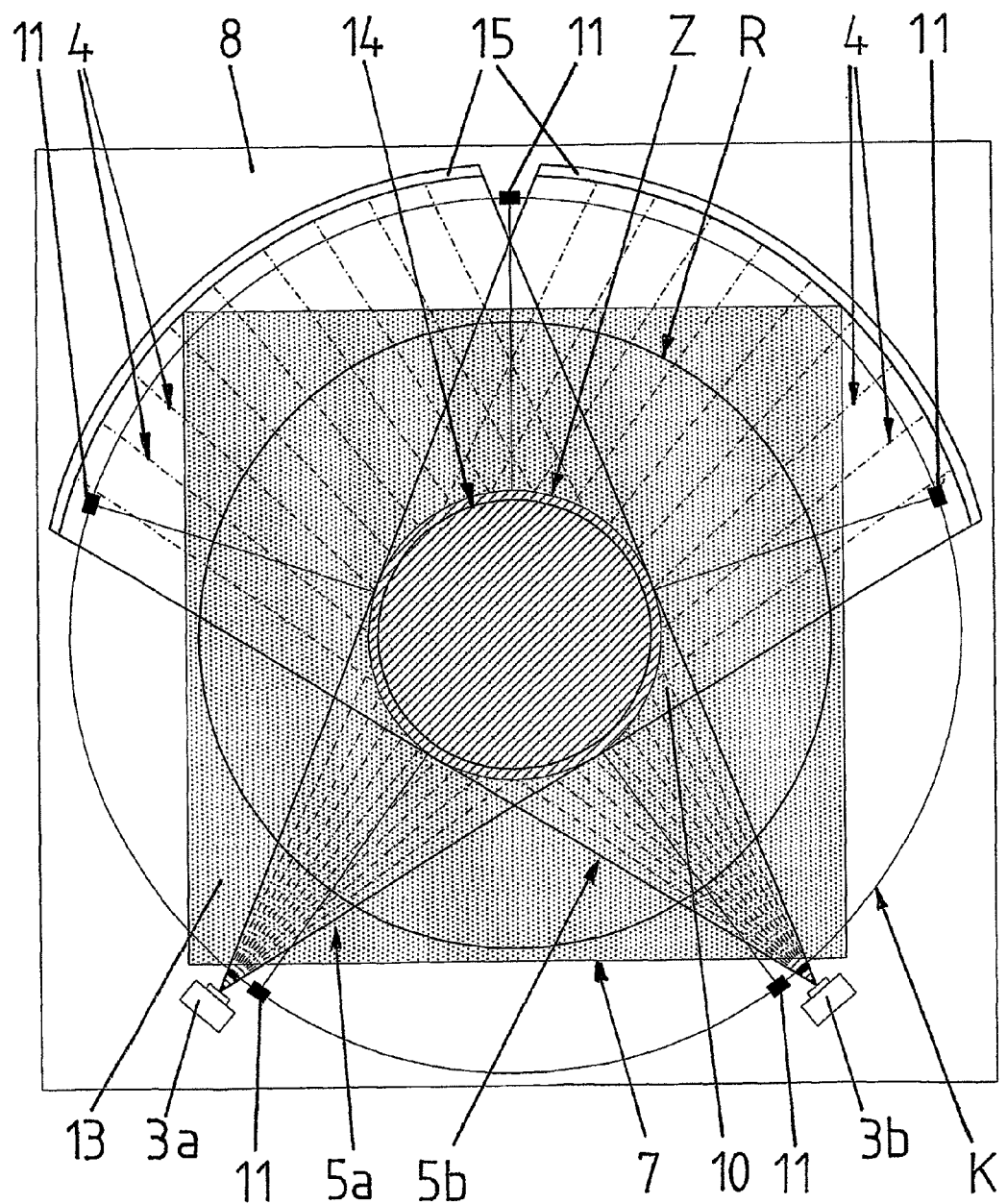
FIG. 1 schematically illustrates a top view on a shooting target according to the invention.
Figure 2:
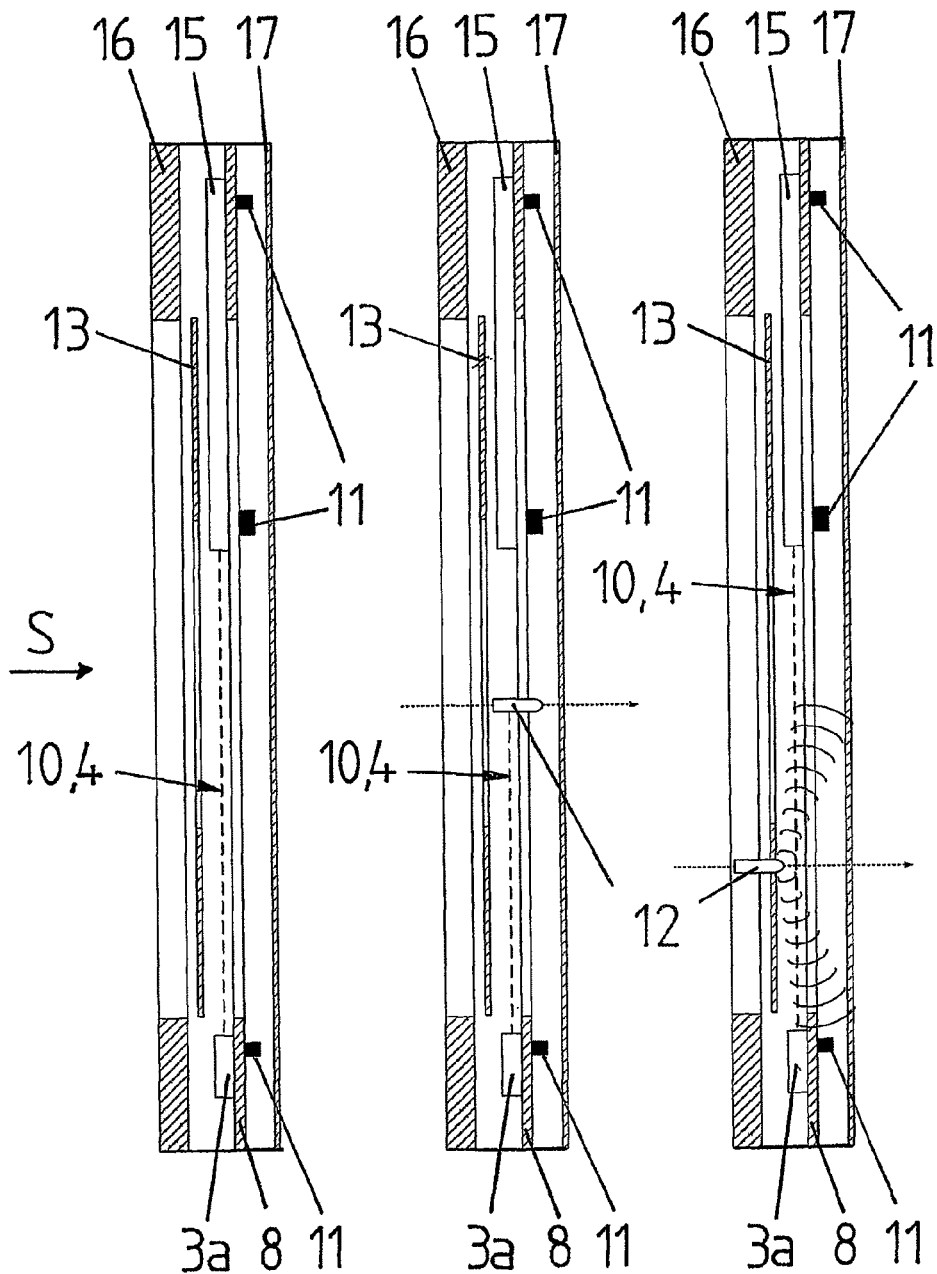
FIGS. 2a to 2c schematically illustrate vertical sections through the shooting target of FIG. 1 in different situations.

The basic concept of the invention results from FIGS. 1 and 2a to 2b, which show in a very schematic way a top view on a shooting target according to the invention (FIG. 1) as well as vertical sections through the shooting target in different situations (FIGS. 2a to 2c).

As can be seen when looking at these figures in combination, the shooting target comprises a circuit board 8 with a central section 7 which, seen in the intended shooting direction S, has on its front side rows 15 composed of a plurality of individual photo-electric light receivers and light sources 3a, 3b for sending light which can be detected by the light receivers. The rows 15 of light receivers and the light sources 3a, 3b are arranged relative to each other in such a way that an optical path 4 (shown by the dashed lines) is formed between each one of the light receivers of the rows 15 and one of the light sources 3a, 3b, via which the respective light receiver can receive light from one of the light sources 3a, 3b.

These optical paths 4 form, seen in the intended shooting direction S, two inter-crossing groups 5a, 5b of optical paths 4 of identical length and by this define an optical screen 10 such that when a projectile 12 passes it, it interrupts at least partially at least one optical path 4 of each of the inter-crossing groups 5a, 5b.

As can be seen further, exactly one light source 3a, 3b is attributed to each group 5a, 5b of optical paths 4, by which all of the optical paths 4 of this group 5a, 5b can be provided with light by emitting a continuous light screen. Thereby, the optical paths 4 of each group 5a, 5b run in a diverging way starting from the light source 3a, 3b attributed to the respective group 5a, 5b. All of the optical paths 4 furthermore run in a common plane.

Furthermore, the circuit board 8 has, seen in the intended shooting direction S, on its back side five acoustic transducers 11 which are arranged evenly distributed on a circular path K at the circumference of the central section 7.

As can be particularly seen in FIGS. 2a to 2c, a canvas-like or plate-like object 13, in the present case a shooting target made of carton, is arranged, seen in the intended shooting direction S, in front of the central section 7 of the circuit board 8, which has in its center a round target opening 14 such that a projectile 12 can pass through it in the intended shooting direction S without damaging the shooting target 13 as a result of a through-shot. Thereby, the target opening 14 is oriented in such a way that it lies, seen in the intended shooting direction S, concentrically inside a circle area Z of maximum diameter which can be defined inside the optical screen.

A protective frame 16 (not shown in FIG. 1) is arranged, seen in the intended shooting direction S, in front of the circuit board 8 and the shooting target 13, which protects the circuit board 8 against shooting impacts but leaves the central section 7 of the circuit board 8 uncovered.

A back wall 17 made of carton, which forms together with the circuit board 8 an acoustic chamber inside which the acoustic transducers 11 are arranged, is arranged, seen in the intended shooting direction S, behind the circuit board 8.

If a projectile 12 passes through the central target opening 14 of the target disc 13, as shown in FIG. 2B, it temporarily interrupts at least partially at least one optical path 4 of each of the inter-crossing groups 5a, 5b of the optical screen 10. In this case the pass-through position through the target disc 13 is determined from the signals delivered by the photo-electric light receivers during the passage through the optical screen 10 by an electronic circuit (not shown) which is also arranged on the circuit board 8.

If however the projectile 12 passes through the target disc 13 in an area surrounding the central opening 14, as shown in FIG. 2c, it generates an acoustic wave when it passes through the target disc 13, which can be detected by the acoustic transducers 11. In this case, the pass-through position through the target disc 13 is also determined with the electronic circuit arranged on the circuit board 8, in this case however from the delay times of the acoustic wave detected by the acoustic transducers 11.

If the projectile 12 passes through the target disc 13 in the edge area of the central opening 14 inside the area of the circular area Z of maximum diameter, which can be defined inside the optical screen 10, the pass-through position is also determined from the signals delivered by the photo-electric light receivers during the passage through the optical screen 10, because the acoustic measurement in this area is imprecise.

As can be seen in FIG. 1, the circular area Z of maximum diameter, which can be defined inside the optical screen 10, has in the present case a diameter which is almost half the diameter of a circular area R of maximum diameter with the same circle center and which can be described in the area where the pass-through position of the projectile through the target disc is determined on the basis of the delay times of the acoustic wave detected by the acoustic transducers, this resulting in the advantage that the optical measurement system can be relatively economical.

Figure 3:
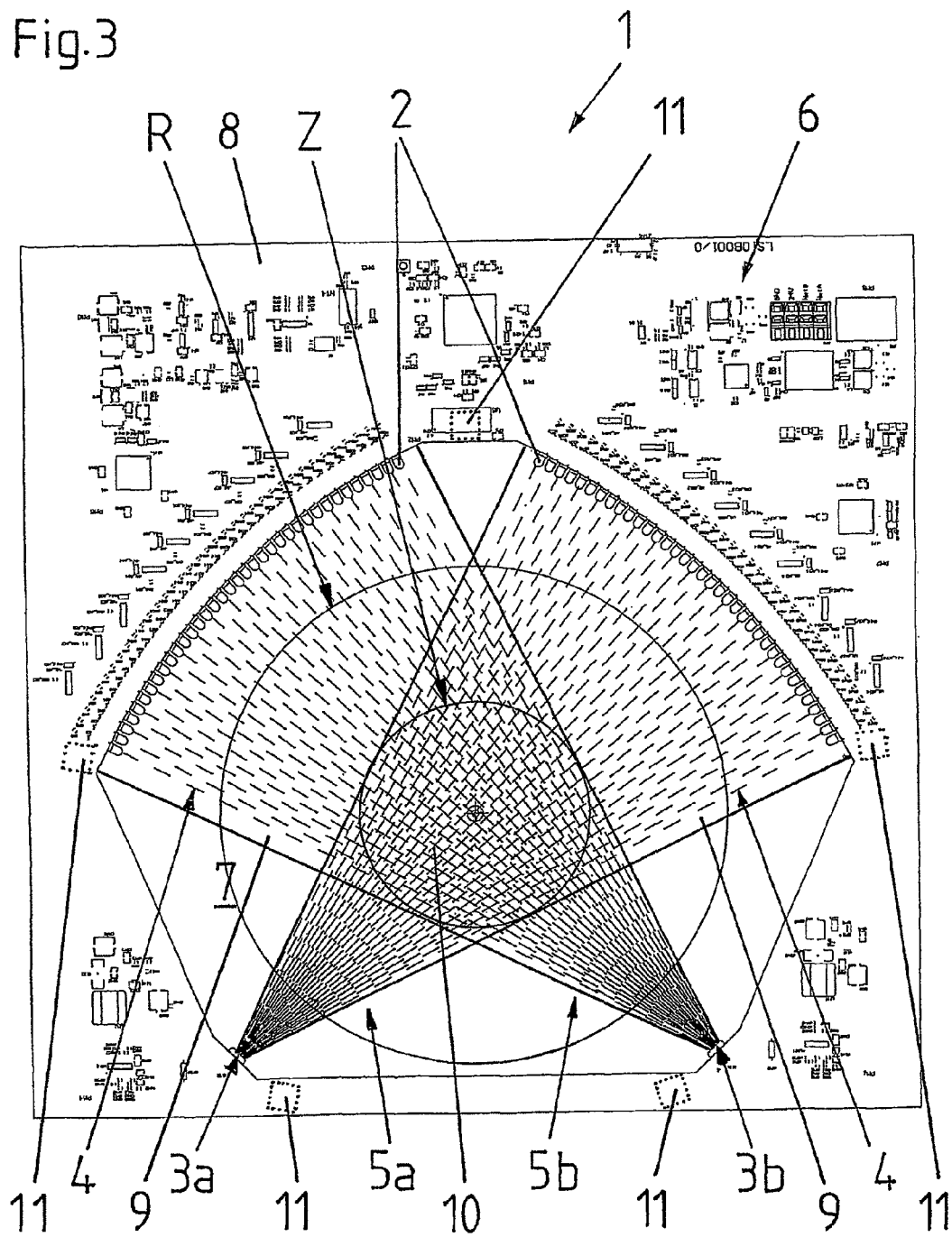
FIG. 3 illustrates an arrangement according to the invention for electronically determining the shooting position on a shooting target.

FIG. 3 shows, in a top view, a specific embodiment of an arrangement 1 according to the invention for electronically determining the shooting position on a shooting target in form of a circuit board 8 with conductor paths and electronic components arranged thereon. This arrangement can be used to form the shooting target according to the invention according to FIGS. 1 and 2a to 2c.

In case of an operation of the arrangement 1 as intended, the circuit board 8 has a central section 7 through which the projectiles, the position of which has to be determined, pass, and in the center of which the optical screen 10 according to the claims is formed. For this, a lot of 36 pieces of infrared sensitive photo transistors 2 (light receivers) are positioned at the upper edge of the section 7 respectively on the right and on the left with their photo-electrically sensitive surfaces arranged in a row side by side and, arranged opposite of them per row one infrared emitting diode 3a, 3b with a line lens (light sources), by which the respective row of photo transistors 2 can be entirely illuminated with a continuous fan-shaped light screen 9. In this way, an optical path (see dashed lines) is formed between each of the photo transistors 2 and the respective emitting diode 3a, 3b attributed to its row.

The optical paths 4 form two inter-crossing groups 5a, 5b of diverging optical paths 4, in the crossing area 10 (optical screen) of which a projectile with a diameter of 3 mm flying through the section 7 temporarily interrupts at least one optical path 4 of each of the two groups 5a, 5b of optical paths 4.

Because the photo transistors 2 and the emitting diodes 3a, 3b are all attached to the circuit board 8 in a plane, all of the optical paths 4 run in a plane which is substantially identical to the circuit plane which runs perpendicular with respect to the direction of the projectile to be detected when flying through the optical screen. Because the rows of photo transistors 2 arranged side by side each form identical circular ring sections, in the centers of curvature of which, in each case, the light-active surface of the respective emitting diode 3a, 3b is arranged, all optical paths 4 have an identical length.

On the backside of the circuit board 8 there are furthermore arranged five identical ultrasonic sensors 11 (acoustic transducers) at a mutual distance in order to detect an acoustic wave generated by a projectile shooting through a target disc (canvas-like or plate-like object), i.e. paper or carton, running in the intended use of the arrangement with a small distance parallel to the inter-crossing groups 5a, 5b of optical paths 4. Because the acoustic transducers 11 are arranged on the circuit board 8, their acoustic active surfaces are arranged in a plane parallel to the two inter-crossing groups 5a, 5b of optical paths 4, the plane having in the present case a distance of about 10 mm to the optical paths 4.

Also, there are different further electronic components and conducting paths arranged on the circuit board 8, which form together an electronic evaluating entity 6 (evaluating entity or evaluator), by which the pass-through position of a projectile through the crossing area 10 of the two inter-crossing groups 5a, 5b of diverging optical paths 4 (optical screen), its pass-through speed as well as its shape or caliber, respectively, can be determined based on the signals delivered by the photo transistors 2 during the pass-through of the projectile and can be shown on a monitor (not shown). Furthermore, the electronic evaluating entity 6 has the capability of determining the pass-through position of a projectile flying through a target disc (canvas-like or plate-like object) running in the intended use of the arrangement with a small distance parallel to the inter-crossing groups 5a, 5b of optical paths 4 based on the delay times of the acoustic wave detected by the acoustic transducers 11, which is generated by the projectile during the pass-through.

The arrangement is thereby formed in such a way that, seen in the intended shooting direction, a circular area of maximum diameter Z, which can be defined within the crossing area 10 of the two inter-crossing groups 5a, 5b of diverging optical paths 4 (optical screen 10), is surrounded entirely by an area inside which the pass-through position of a projectile through a target disc (canvas-like or plate-like object), running in the intended use of the arrangement with a small distance parallel to the inter-crossing groups 5a, 5b of optical paths 4, can be determined on the basis of the delay times of the acoustic wave detected by the acoustic transducers 11.

As can be seen, in the present case the circular area Z of maximum diameter defined within the crossing area 10 of the two inter-crossing groups 5a, 5b of diverging optical paths 4 (optical screen 10) is smaller than half the size of a circular area R of maximum diameter with the same circle center, inside which the pass-through position of a projectile through a target disc (canvas-like or plate-like object), running in the intended use of the arrangement with a small distance parallel to the inter-crossing groups 5a, 5b of optical paths 4, can be determined on the basis of the delay times of the acoustic wave detected by the acoustic transducers 11.

Additionally, the evaluating entity 6 is formed in such a way that a calibration of the arrangement 1 is possible by approaching defined pass-through positions in the crossing area 10 of the inter-crossing groups 5a, 5b of diverging optical paths 4 (optical screen 10) with a projectile dummy or with an opaque body representing a shooting path, as well as a continuous self-calibration of the arrangement with respect to the maximum and minimum brightness values occurring for each photo transistor 2 is possible in operation based on the signals delivered by the photo transistors 2 and the determined pass-through positions of the projectiles.

The entire arrangement is dip-coated and therefore weatherproof and is used in the intended use in the shown orientation, i.e. with the light-emitting diodes 3a, 3b at the bottom and the photo transistors 2 at the top.

While a preferred embodiment is described in the present application, it has to be pointed out clearly that the invention is not limited thereto and can also be executed in a different way within the scope of the now following claims.

The invention claimed is:

1. An arrangement for electronically determining a shooting position on a shooting target, the arrangement comprising:
    light sources for transmitting light;
    photo-electric light receivers, structured and arranged to detect the light transmitted by the light sources, being arranged to form optical paths between the light sources and the light receivers, the optical paths being formed into at least two inter-crossing groups to define an optical screen arranged generally perpendicular to a shooting direction, wherein at least one optical path of each of the inter-crossing groups is at least temporarily interruptible by a projectile passing through the optical screen;
    at least one of a canvas-like or plate-like object arranged generally parallel to the optical screen;
    multiple acoustic transducers being arranged at a distance from each other for detecting an acoustic wave generatable by a projectile when shot through the at least one canvas-like or plate-like object; and
    an electronic evaluator structured and arranged to determine at least one of a pass-through position of the projectile in relation to the optical screen from signals received from the photo-electric light receivers and a pass-through position of a projectile in relation to the at least one canvas-like or plate-like object based on delay times detected by the multiple acoustic transducers of the acoustic wave generatable by the projectile being shot through the at least one canvas-like or plate-like object,
    wherein the arrangement, in the shooting direction, is structured so that a circular area definable within the optical screen is surrounded at least partially by an area of the at least one canvas-like or plate-like object in which the acoustic wave is generatable.

2. The arrangement according to claim 1, wherein the at least two inter-crossing groups of optical paths is exactly three inter-crossing groups of optical paths.

3. The arrangement according to claim 1, wherein the area of the at least one canvas-like or plate-like object in which the acoustic wave is generatable is structured with an outer circular circumference having a center aligned with a center of the circular area in the shooting direction, and wherein the circular area has a diameter of at most two thirds a diameter of the outer circular circumference.

4. The arrangement according to claim 3, wherein the diameter of the circular area is at most one half the diameter of the outer circular area.

5. The arrangement according to claim 3, wherein the outer circular area of the at least one canvas-like or plate-like object is structured with a target opening having a center aligned, in the shooting direction, with the center of the outer circular circumference and with the center of the circular area.

6. The arrangement according to claim 1, wherein the multiple acoustic transducers are arranged in the plane parallel to the optical screen, which is located at a distance smaller than 20 mm to the optical screen.

7. The arrangement according to claim 1, wherein the light receivers comprise a plurality of individual photo-electric light receivers, such that an optical path is formed between each of the plurality of individual photo-electric light receivers with light received from one of the light sources.

8. The arrangement according to claim 1, wherein a light source is associated with each of the at least two inter-crossing groups of optical paths in order to generate all of the optical paths of the inter-crossing group by emitting a continuous light screen.

9. The arrangement according to claim 8, wherein the optical paths generated in each of the at least two inter-crossing groups are oriented in a diverging manner starting from the light source attributed to this group.

10. The arrangement according to claim 8, wherein the light emitted by the light source is emitted as a continuous light screen.

11. The arrangement according to claim 1, wherein the optical paths generated in each of the at least two inter-crossing groups are oriented to run in a same plane or have a distance of at most +/−3 mm with respect to a plane formed in the middle between the optical paths.

12. The arrangement according to claim 1, wherein the optical paths generated in each of the at least two inter-crossing groups have the same length.

13. The arrangement according to claim 1, wherein at least a part of the optical paths is deflected via mirror surfaces or prisms.

14. The arrangement according to claim 1, wherein the optical paths of each of the at least two inter-crossing groups have at least one of a smaller mutual distance and a smaller divergence in a middle area of each respective group than in edge areas of the respective groups.

15. The arrangement according to claim 1, wherein the light receivers forming the optical paths for each of the at least two inter-crossing groups are arranged per group in such a way that their photo-electric-sensitive surfaces are arranged side by side in one or more rows.

16. The arrangement according to claim 15, wherein the photo-electric-sensitive surfaces are each arranged side by side in a middle area of a respective group in a higher number of rows than in the edge areas of the group.

17. The arrangement according to claim 15, further comprising at least one of an optical diffuser and a lens arrangement for optically decreasing or cancelling out gaps present between individual photo-electric-sensitive surfaces.

18. The arrangement according to claim 1, further comprising a fan arrangement for acting upon at least one of photo-electric sensitive surfaces of the light receivers and light-active surfaces of the light sources with an air stream for avoiding an accumulation of dirt.

19. The arrangement according to claim 1, wherein the light receivers and the electronic evaluator are structured and arranged so that a plurality of different brightness values are distinguishable for each light receiver in order to determine a pass-through position of the projectile through the optical screen.

20. The arrangement according to claim 19, wherein the electronic evaluator is structured and arranged for continuous self-calibration of the arrangement via determination of maximum and minimum brightness values occurring for each light receiver based on signals delivered by the light receivers at determined pass-through positions of the projectiles.

21. The arrangement according to claim 1, wherein the electronic evaluator is structured and arranged for calibration of the arrangement via approaching defined pass-through positions in the optical screen with a projectile dummy or with an opaque body representing a shooting path respectively.

22. The arrangement according to claim 1, wherein signals of the light receivers are evaluatable at least 100,000 times per second.

23. The arrangement according to claim 22, wherein the electronic evaluator is structured and arranged to determine at least one of a speed, a shape and/or a thickness of the projectile by evaluating the signals delivered by the photo-electric light receivers during the passage of the projectile through the optical screen.

24. The arrangement according to claim 22, wherein signals of the light receivers are evaluatable at least 200,000 times per second.

25. The arrangement according to claim 1, wherein the optical paths generated in each of the at least two intercrossing groups are oriented to run in parallel planes arranged to be separated from each other by a distance of at most +/−3 mm with respect to a plane formed between the parallel planes.

26. A shooting target, particularly shooting disc, comprising the arrangement according to claim 1, wherein the at least one canvas-like or plate-like object, which is structured and arranged to form a substantially plane surface for shooting at with projectiles, comprises one of a rubber tissue, plastic foil, paper or carton.

27. The shooting target according to claim 26, wherein the at least one canvas-like or plate-like object has a round target opening in a central area, through which a projectile traveling in the shooting direction is passable without penetrating the at least one canvas-like or plate-like object, and wherein a position of the projectile passing through the round target opening is determinable based on signals delivered by the photo-electric light receivers when the projectile passes through the optical screen.

28. The shooting target according to claim 27, wherein the at least one canvas-like or plate-like object is arranged to surround the round target area, and a position of the projectile penetrating the at least one canvas-like or plate-like object is determinable from delay times detected by the acoustic transducers of an acoustic wave generated by the projectile penetrating the at least one canvas-like or plate-like object.

29. The shooting target according to claim 27, wherein a circular area coaxial with the round target area extends to at least an edge limit of the round target area.

30. The shooting target according to claim 26, wherein, relative to the shooting direction, the acoustic transducers are arranged behind the at least one canvas-like or plate-like object and the optical screen is arranged one of in front of or behind the at least one canvas-like or plate-like object.

31. The shooting target according to claim 26, wherein the optical paths of the optical screen are arranged to run diagonally at least one of in front of, behind and in a target plane and the light detectors are arranged above the light sources.

\* \* \* \* \*